United States Patent
Gigliotti et al.

(10) Patent No.: US 9,521,178 B1
(45) Date of Patent: Dec. 13, 2016

(54) DYNAMIC BANDWIDTH THRESHOLDS

(75) Inventors: Samuel S. Gigliotti, Seattle, WA (US); James Marvin Freeman, II, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 59 days.

(21) Appl. No.: 12/643,719

(22) Filed: Dec. 21, 2009

(51) Int. Cl.
G06F 15/16 (2006.01)
H04L 29/06 (2006.01)

(52) U.S. Cl.
CPC ............. *H04L 65/602* (2013.01); *H04L 65/60* (2013.01); *H04L 65/601* (2013.01)

(58) Field of Classification Search
CPC ...... H04L 65/60; H04L 65/601; H04L 65/602; H04L 65/604; H04L 65/605; H04L 65/607
USPC .................................. 709/231; 370/229–240
See application file for complete search history.

(56) References Cited

U.S. PATENT DOCUMENTS

| | | | |
|---|---|---|---|
| 6,175,871 B1 | 1/2001 | Schuster et al. | |
| 6,243,497 B1 | 6/2001 | Chiang et al. | |
| 6,647,389 B1 | 11/2003 | Fitch et al. | |
| 6,789,123 B2 | 9/2004 | Li et al. | |
| 6,850,965 B2 | 2/2005 | Allen | |
| 7,075,584 B2 | 7/2006 | Crinon | |
| 7,224,691 B1 | 5/2007 | Yeluri et al. | |
| 7,346,007 B2 * | 3/2008 | Curcio et al. | 370/252 |
| 7,373,413 B1 | 5/2008 | Nguyen et al. | |
| 7,483,489 B2 * | 1/2009 | Gentric et al. | 375/240.26 |
| 8,151,019 B1 * | 4/2012 | Le et al. | 710/52 |
| 2002/0094031 A1 | 7/2002 | Ngai et al. | |
| 2002/0133247 A1 | 9/2002 | Smith et al. | |
| 2002/0154694 A1 | 10/2002 | Birch | |
| 2002/0165970 A1 * | 11/2002 | Ludewig | 709/228 |
| 2003/0165150 A1 | 9/2003 | Zimmermann et al. | |
| 2003/0236902 A1 * | 12/2003 | Weiss et al. | 709/231 |
| 2004/0153951 A1 * | 8/2004 | Walker et al. | 714/776 |
| 2004/0176111 A1 * | 9/2004 | Wilhelm | H04L 1/0003 455/456.6 |
| 2004/0202248 A1 | 10/2004 | Boroczky et al. | |
| 2004/0264489 A1 | 12/2004 | Klemets et al. | |

(Continued)

FOREIGN PATENT DOCUMENTS

| | | |
|---|---|---|
| JP | 11187367 | 7/1999 |
| JP | 2004135308 | 4/2004 |

(Continued)

OTHER PUBLICATIONS

U.S. Appl. No. 61/057,755, filed May 30, 2008.

(Continued)

Primary Examiner — James Conaway
(74) Attorney, Agent, or Firm — Lee & Hayes, PLLC (57) ABSTRACT

Dynamic bandwidth thresholds enable substantially uninterrupted transmission of a highest compatible bit rate of a stream of media from a host to a client via a network connection. The client may include one or more buffers for receiving the stream of media. Attributes including the geolocation information of the client, buffer activity, and a bandwidth of the network connection may be monitored to determine an alternative bit rate of the stream of media. Future streams of media may be served at the alternative bit rate to provide clients sharing one or more of the monitored attributes with the highest compatible bit rate based on the monitored attributes.

24 Claims, 8 Drawing Sheets

(56) References Cited

U.S. PATENT DOCUMENTS

| | | |
|---|---|---|
| 2004/0267983 A1 | 12/2004 | Oda |
| 2005/0117580 A1* | 6/2005 | del Val et al. ............. 370/395.2 |
| 2006/0062292 A1 | 3/2006 | Boice et al. |
| 2006/0109856 A1 | 5/2006 | Deshpande |
| 2006/0143678 A1 | 6/2006 | Chou et al. |
| 2006/0165166 A1 | 7/2006 | Chou et al. |
| 2006/0198446 A1 | 9/2006 | Ribas-Corbera et al. |
| 2006/0224762 A1 | 10/2006 | Tian et al. |
| 2006/0242315 A1 | 10/2006 | Nichols |
| 2006/0271979 A1 | 11/2006 | Hejna, Jr. |
| 2007/0002946 A1 | 1/2007 | Bouton et al. |
| 2007/0033633 A1 | 2/2007 | Andrews et al. |
| 2007/0110168 A1 | 5/2007 | Kravtsov et al. |
| 2007/0133405 A1 | 6/2007 | Bowra et al. |
| 2007/0160127 A1* | 7/2007 | Ratakonda et al. .......... 375/240 |
| 2008/0022005 A1 | 1/2008 | Wu et al. |
| 2008/0101461 A1 | 5/2008 | Person et al. |
| 2008/0147786 A1* | 6/2008 | Liwerant et al. ............. 709/203 |
| 2008/0151998 A1 | 6/2008 | He |
| 2008/0172441 A1 | 7/2008 | Speicher et al. |
| 2008/0195744 A1 | 8/2008 | Bowra et al. |
| 2008/0195748 A1* | 8/2008 | Tierney et al. ............... 709/232 |
| 2009/0089445 A1* | 4/2009 | Deshpande .................... 709/231 |
| 2009/0144792 A1* | 6/2009 | Fielibert et al. .............. 725/116 |
| 2009/0150219 A1* | 6/2009 | Headings ........... G06Q 30/0601 705/59 |
| 2009/0235318 A1* | 9/2009 | Amsterdam et al. ........... 725/87 |
| 2009/0282162 A1 | 11/2009 | Mehrotra et al. |
| 2009/0300204 A1 | 12/2009 | Zhang et al. |
| 2009/0307367 A1* | 12/2009 | Gigliotti ....................... 709/231 |
| 2010/0088425 A1* | 4/2010 | Hooda .................. H04W 4/001 709/231 |
| 2010/0121977 A1 | 5/2010 | Kontola et al. ............... 709/232 |
| 2010/0161825 A1* | 6/2010 | Ronca et al. ................. 709/231 |
| 2010/0169453 A1* | 7/2010 | Biderman et al. ............ 709/217 |
| 2010/0299552 A1* | 11/2010 | Schlack et al. .................... 714/4 |
| 2011/0022705 A1* | 1/2011 | Yellamraju et al. .......... 709/224 |
| 2011/0023072 A1* | 1/2011 | Hodzic ............ H04N 21/23109 725/95 |
| 2011/0040894 A1* | 2/2011 | Shrum et al. .................. 709/246 |
| 2011/0047287 A1* | 2/2011 | Harrang .................. H04L 45/00 709/235 |
| 2011/0093605 A1* | 4/2011 | Choudhury et al. .......... 709/231 |
| 2011/0153860 A1* | 6/2011 | Hamel et al. ................. 709/231 |
| 2012/0014254 A1 | 1/2012 | Todd et al. |
| 2012/0222078 A1 | 8/2012 | Stahl et al. |
| 2013/0095880 A1* | 4/2013 | Tzamaloukas ........ H04W 48/18 455/525 |
| 2015/0215361 A1 | 7/2015 | Gigliotti |

FOREIGN PATENT DOCUMENTS

| | | |
|---|---|---|
| JP | 2006115264 | 4/2006 |
| JP | 2008035102 | 2/2008 |
| JP | 2008537393 | 9/2008 |

OTHER PUBLICATIONS

U.S. Appl. No. 61/057,759, filed May 30, 2008.

Hassoun, "Flash Media Server Article, Dynamic Stream Switching with Flash Media Server 3", Adobe—Developer Center, printed Jun. 6, 2008, found at http://www.adobe.com/devnet/flashmediaserver/articles/dynamic_stream_switching.html, 34 pages.

Non-Final Office Action for U.S. Appl. No. 12/135,034, mailed on Mar. 28, 2012, Siddharth Srirarm et al., "Stream Complexity Mapping", 24 pages.

Translated Japanese Office Action mailed Jul. 1, 2014 for Japanese patent application No. 2011-512585, a counterpart foreign application of U.S. Appl. No. 12/134,988, 6 pages.

European Office Action mailed Oct. 14, 2014 for European patent application No. 09759259.6, a counterpart foreign application of U.S. Appl. No. 12/134,988, 5 pages.

Office Action for U.S. Appl. No. 12/134,988, mailed on Oct. 1, 2014, Samuel S. Gigliotti, "Client Side Stream Switching", 29 pages.

Office action for U.S. Appl. No. 12/135,034, mailed on Sep. 30, 2014, Sriram et al., "Stream Complexity Mapping", 24 pages.

Office action for U.S. Appl. No. 12/134,988, mailed on Nov. 7, 2012, Gigliotti, "Client Side Stream Switching", 30 pages.

Final Office Action for U.S. Appl. No. 12/135,034, mailed on Jul. 23, 2012, Siddharth Srirarm et al., "Stream Complexity Mapping", 41 pages.

Extended European Search Report mailed Jun. 10, 2013 for European patent application No. 09759259.6, a counterpart foreign application of U.S. Pat. No. 09759259.6, 14 pages.

Office Action for U.S. Appl. No. 12/135,034, mailed on May 7, 2014, Siddharth Sriram, "Stream Complexity Mapping", 17 pages.

Apostolopoulos et al., "Video Streaming: Concepts, Algorithms, and Systems", HP Laboratories, 2002, 35 pages.

Office action for U.S. Appl. No. 12/134,988, mailed on Mar. 28, 2013, Gigliotti, "Client Side Stream Switching", 46 pages.

Translated Japanese Office Action mailed Sep. 3, 2013 for Japanese Patent Application No. 2011-512585, a counterpart foreign application of U.S. Appl. No. 12/134,988, 7 pages.

PCT Search Report and Written Opinion for PCT Application No. PCTUS0945995, mailed Jul. 23, 2009 (8 pages).

European Office Action mailed Aug. 24, 2015 for European patent application No. 09759259.6, a counterpart foreign application of U.S. Appl. No. 12/134,988, 5 pages.

* cited by examiner

DYNAMIC BANDWIDTH THRESHOLDS

BACKGROUND

It has become increasingly common for people to access media content over networks for use on computing devices. The Internet, in particular, has facilitated downloading and streaming of a wide availability of digital content. Many people are using network access to find, retrieve, and enjoy streaming media rather than relying on traditional content delivery methods such as over-the-air reception, cable transmission, satellite audio/video, and other distribution sources that push media to users typically on a scheduled basis that the user cannot control.

One particular difficulty with streaming media over the internet is limited bandwidth between a person's computing device and a host. Many people experience undesirable delays in receipt of streaming media or interruptions during play of the stream of media. One solution to expedite receipt of a stream of media to a computing device is to lower the quality of the media, such as by reducing a bit rate associated with the stream of media. However, people often desire the highest quality stream of media possible, which may vary based on a network connection bandwidth. Currently, tests of network connection bandwidth are based on short downloads. However, testing bandwidth based on short downloads does not adequately account for bandwidth concerns related to consumption of streaming media. Therefore, it is desirable to improve the quality of streaming media while reducing interruptions that people find undesirable while receiving streaming media due to bandwidth throttling or decreased bandwidth during long network connections.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Users typically desire a high quality media stream without interruptions. However, many factors may make it difficult to provide the users with both a high quality and an uninterrupted stream of media. One factor is bandwidth of a network connection between a host that delivers the stream and a client used by the user to receive the stream. As described herein, media streams may be transmitted at different bit rates depending upon various conditions. For instance, a media stream may be transmitted at an initial bit rate to the client, where the bit rate is expected to ensure an uninterrupted or substantially uninterrupted stream of media. The host may then transition the stream of media to a higher or lower bit rate based on future bandwidth measurements, among other possible factors, to adjust the quality of the stream while the client receives an uninterrupted stream of media.

One of the factors that affects bandwidth is Internet Service Provider (ISP) traffic sharing (e.g., throttling, bandwidth allocation reduction, etc.). In some instances, ISPs reduce bandwidth allocation to subscribers when the subscribers' Internet connection exceeds a predetermined duration of time or the amount of bandwidth used exceeds a predetermined threshold. ISP bandwidth reduction may make it difficult to provide the user with both a high quality and an uninterrupted media stream.

As discussed herein, a media stream may have a variable bit rate (VBR) or a constant bit rate (CBR). A VBR includes a bit rate value that is representative of the stream of media, such as an average or median bit rate value. In VBR streams of media, portions of the stream of media may have higher or lower bit rate values. For example, an action scene of a video may be a complex portion and include a high bit rate value while another scene with little change in scenery, backdrop, etc., may not be complex and may have a low bit rate value. In contrast, CBR streams of media have a constant bit rate value. CBR streams typically adjust quality levels of the media based on the complexity of the stream of media, thus lowering quality during highly complex portions to keep the bit rate constant. As discussed herein, the bit rate may be either VBR or CBR unless otherwise specified.

For purposes of discussion, client side stream switching and host side dynamic control of bandwidth thresholds is described in the context of streaming audio and/or video from a host supporting a website. One illustrative implementation of this context is provided below. However, the described content style and extended bandwidth detection techniques may be implemented in other contexts. Moreover, other distribution configurations may be used to implement client side stream switching and host side dynamic control of bandwidth thresholds as performed by the illustrated architecture.

Illustrative System Architecture

Figure 1:
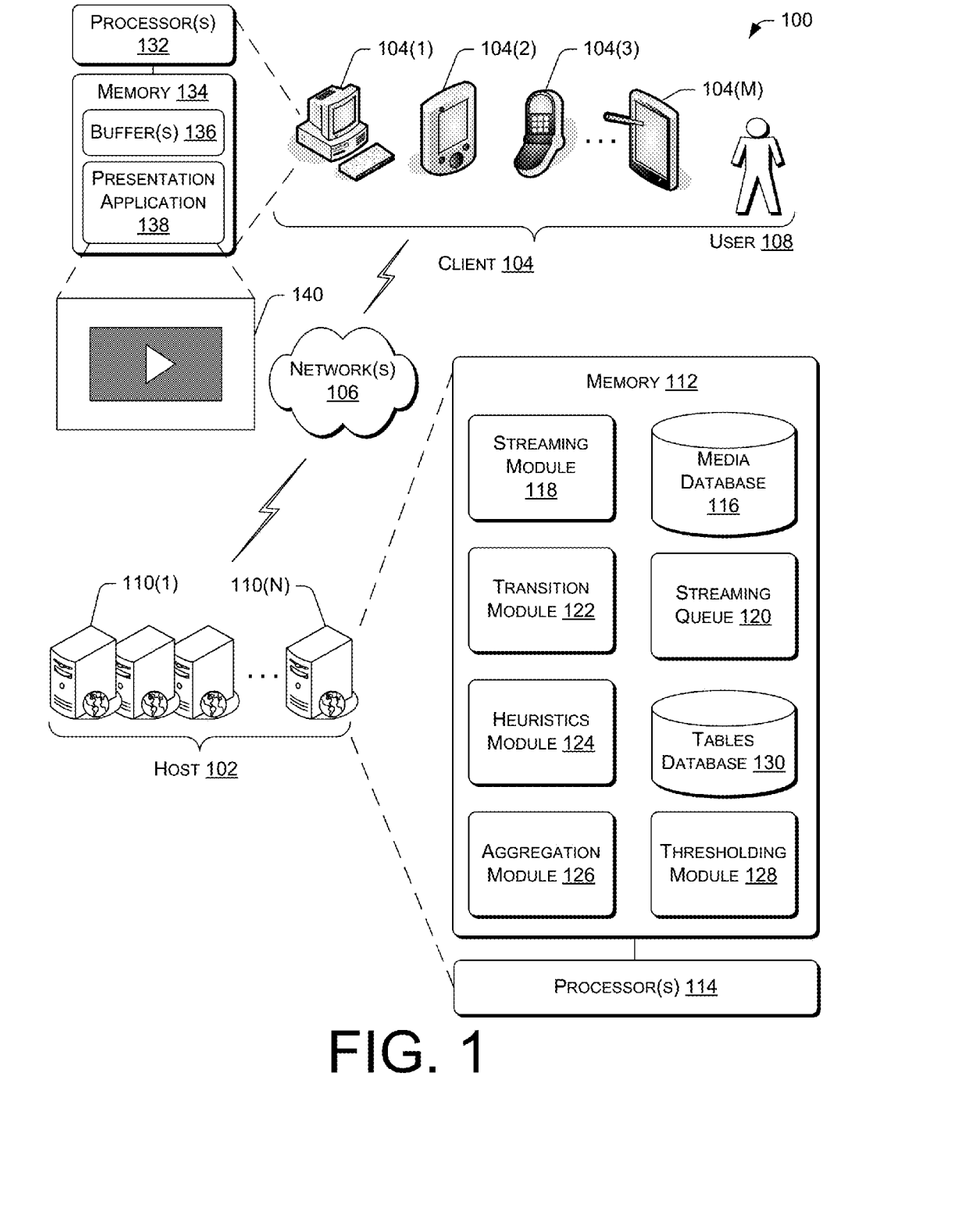
FIG. 1 is a pictorial diagram showing an illustrative computing environment in which one or more embodiments of dynamic bandwidth thresholds may be implemented.

FIG. 1 is a pictorial diagram showing an illustrative computing environment 100 in which one or more embodiments of client side stream switching and host side dynamic control of bandwidth thresholds may be implemented. In the environment 100, a host 102 may be in communication with a client 104 via a network 106. In certain implementations, the host 102 may transmit streaming media to the client 104 for playback to a user 108.

Representative clients are illustrated in FIG. 1 as including a computer 104(1), a television 104(2) (via a receiver), a mobile telephone 104(3) (e.g., smart phone, etc.), and a portable digital assistant (PDA) 104(M). However, other devices capable of receiving streaming media from the host 102 and displaying and/or emitting the streaming media for consumption by the user 108 may be employed. For example, the client 104 may also be a set-top box, a game console, and so forth.

The network 106 may be a Local Area Network ("LAN"), a larger network such as a Wide Area Network ("WAN"), or a collection of networks, such as the Internet. Protocols for network communication, such as TCP/IP, are well known to those skilled in the art of computer networks and may be used to implement the network connections described herein. Persons of ordinary skill in the art will recognize that the concepts disclosed herein may also be used in other interactive environments, such as local or wide area networks that connect servers storing related documents and associated files, scripts, and databases, or broadcast communication networks that include set-top boxes or other information appliances providing access to audio or video files, documents, scripts, databases, etc.

The host 102 may include one or more servers 110(1), . . . , 110(N), that may be arranged in a cluster, as a server farm, or as part of a data center. Each server 110 may be a web server or another type of information server including a memory 112 coupled to a processor 114. Other server architectures may also be used to support the host 102. The host 102 is capable of handling requests from many users and serving, in response, various streams of data that can be rendered at the client 104. In some embodiments, the host 102 is a web server that supports user interaction, including online retailers, entertainment sites, content distribution sites (e.g., documents, audio and/or video), informational sites, social networking sites, blog sites, news and entertainment sites, and so forth. For example, the host 102 may serve different pieces of media that may include previews of content and the content itself. Thus, an individual piece of content may be an audio file such as an album, song, lecture, audio article or book. An individual piece of content may also be an audio/visual file such as a movie, a television program, or a live recording. Additionally, an individual piece of content may also be a preview of one of the other types of individual pieces of content. Often, the user 108 may desire to receive many pieces of content, such as when the user navigates a website and previews different sources of content.

In some embodiments, the configuration of the host 102 and the client 104 may be structured as a web based system, or other types of client/server-based communications and associated application logic could be used such as a cable-television head-end and television set-top box environment, a digital video recorder with corresponding remote service provider, a mobile device and corresponding remote service provider, among other possibilities. When the user 108 accesses the host 102, the client 104 submits a request, such as in the form of a uniform resource locator (URL), to the servers 110(1)-(N). Upon receiving the request, the servers 110(1)-(N) return streaming media to the client 104.

In the illustrative environment 100, the host 102 represents a web server that hosts a media database 116. The media database 116 stores a collection of media which may be transmitted from the host 102 to the client 104 via the network 106 for playback to the user 108. The term "media" includes any video and/or audio which may be streamed to the user 108, such as movies, television shows, previews, personal video recordings, music, news, or any other type of video and/or audio which may be streamed over the network 106 from the host 102 to the client 104.

In FIG. 1, the host 102 may include a streaming module 118 to transmit content of the media database 116 to the user 108 via the client 104. In some embodiments, the streaming module 118 may include one or more video renderers that enable display of the video to the users 108. In addition, the streaming module 118 may manage one or more buffers for storing content of the media database 116. In one or more embodiments, the streaming module 118 may interact with a streaming queue 120 to manage buffers, store content, or otherwise maintain media from the media database 116 that is processed by the streaming module 118.

In accordance with one or more embodiments, a transition module 122 may interact with the streaming queue 120 to transition from a first stream of media at a first bit rate to a second stream of media at a second bit rate. For example and without limitation, the first stream of media may be a video content encoded at 600 kbps while the second stream of media may be the same content encoded at 900 kbps. Therefore, the content of the stream of media may be the same while the quality (pixels, resolution, audio compression, etc.) may be different. The transition module 122 may cause the host 102 to facilitate a continuous streaming transition from the first stream of media to the second stream of media while maintaining an uninterrupted or substantially uninterrupted stream of media to the client 104 for playback to the user 108.

A heuristics module 124 may provide data to assist in the transition process provided by the transition module 122 and/or the streaming process provided by the streaming module 118. For example, the heuristics module 124 may determine when to begin filling a buffer with streaming media from the media database 116 to enable the client 104 to receive uninterrupted streaming content. In some embodiments, the heuristics module 124 may determine an ideal bit rate for streaming media based on a measured bandwidth of the network 106, among other possible factors. The heuristics module 124 may dynamically control the selection of the bit rate of the media content to provide the highest bit rate media stream to the client 104 based on the measured bandwidth.

Suppose for example, that the host 102 stores a particular media content that is encoded in five different bit rates designated as A, B, C, D, and E, where "A" is the lowest bit rate and "E" is the highest bit rate. The host 102 may initially serve the media stream at the middle bit rate "C". However, during this streaming, suppose that the amount of streamed data stored in a buffer at the client 104 rises above a certain fill level (watermark), indicating that the client can accept content at a higher bit rate and thus receive the content in an improved quality. This may trigger measurement to determine whether more bandwidth is available for delivery of this media stream. In response, the heuristics module 124 may determine that the bit rate should be adjusted to one of the two higher bit rates "E" or "D" based on the measured bandwidth. Further suppose that the host 102 stores the media content encoded in the five bit rates and the host 102 may initially serve the media stream at the middle bit rate "C". However, during this streaming, suppose that the amount of streamed data stored in a buffer at the client 104 drops below a certain fill level, indicating that the client cannot accept content at that high of a bit rate. This may indicate that less than expected bandwidth is available for delivery of this media stream. In response, the heuristics module 124 may determine that the bit rate should be adjusted to one of the two lower bit rates "A" or "B" based on the measured bandwidth.

In some embodiments, the heuristics module 124 may selectively determine an ideal bit rate which may be used to select a new bit rate. The new bit rate may be selected from any of the available bit rates and to allow the host 102 to transition to streaming at another bit rate, which may not be a next higher or lower bit rate relative to the current bit rate.

An aggregation module 126 may aggregate data (information) from one or more clients and provide the aggregated data to the heuristics module 124 and/or the transition module 122 and/or the streaming module 118. For example, the aggregation module 126 may aggregate geolocation information for multiple clients. The geolocation information may include client internet protocol (IP) addresses, identification of the Internet Service Provider (ISP), the city or geographical region in which the client is located, etc. The aggregation module 126 may also aggregate auxiliary information for multiple clients. The auxiliary information may include identification of the client operating system, identification of the client processor, for example by model, identification of the type of client memory, the configuration of the client memory, etc.

A thresholding module 128 may use the information from one or both of the heuristics module 124 and the aggregation module 126 to set or update correspondences between available bandwidth and the bit rate for streaming media periodically. For example, the thresholding module 128 may perform a weekly update of the threshold correspondence based on accumulated information of buffer overfills and/or buffer fill levels dropping below an acceptable level so that another client connected to network 106 at a later time via the same ISP as a previous client 104 may receive a media stream requiring no or substantially no rebuffering during playback of the media stream. The thresholding module 128 may also apply limits on the threshold updates. For example, the thresholding module 128 may limit the corresponding bandwidth to no more than twice the bit rate (or another factor of the bit rate). In the event that the thresholding module 128 activates such a limit, the thresholding module may revise the threshold correspondence, and/or may send a limit alert to one or more of the other modules on host 102.

The updated threshold correspondences are stored in a tables database 130 for use by the various modules of the host 102. In certain embodiments, a table from the tables database 130 is forwarded to a client 104. For example, the table from tables database 130 may be forwarded based on the geolocation information of the client 104. These tables may include bandwidth information, such as correlations between bit rate and bandwidth, which can be used by the client 104 to adapt to changing media streams. For example, the tables may include bit rate and bandwidth values to implement dynamic bandwidth thresholds that serve as input to rules that run on the client 104. The client side rules are discussed below.

As illustrated, each client 104(1), . . . , 104(M) is equipped with one or more processors 132 and memory 134 to store data and applications and to process data. The memory 134 may include one or more buffers 136 to store data, such as streaming media received from the host 102. According to some embodiments, a presentation application 138 is stored in the memory 134 and executes on the processor 132 to provide streaming media from the host 102. The presentation application 138 may render streaming media 140 served by the host 102 on an associated display of the client 104. For example, the presentation application 138 may be a browser configured with a media streaming plug-in which is capable of processing and playing the streaming media 140.

In accordance with one or more embodiments, one or more of the streaming module 118, the transition module 122, the heuristics module 124, the aggregation module 126, and the thresholding module 128 may be implemented on the client 104 in addition to, or instead of, being implemented on the host 102. The client 104 may include at least a portion of the functionality of the streaming module 118. For example, the client 104 may include an application which includes rendering software to receive a stream of media and output it for playback to the user 108. In addition, the client 104 may include the transition module 122 for transitioning between a first stream of media and a second stream of media. In some embodiments, all or a portion of the functionality of the heuristics module 124 may be implemented on the client 104. For example, the functionality of the heuristics module 124 that calculates the ideal bit rate may be implemented on the client 104 to enable a client side measurement of the bandwidth of the network 106 to determine the ideal bit rate for streaming media.

Figure 2:
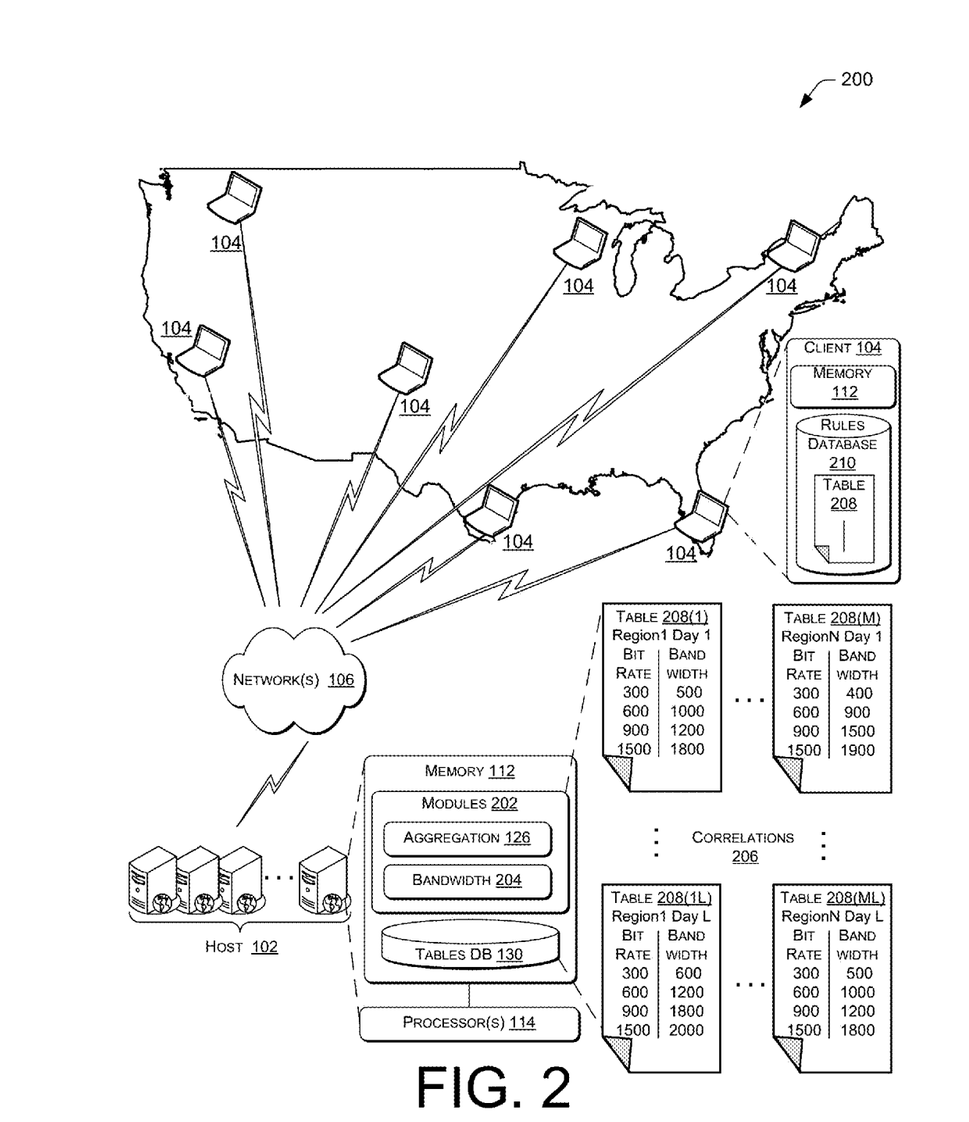
FIG. 2 is a pictorial diagram showing another perspective of an illustrative computing environment for implementing dynamic bandwidth thresholds.

In accordance with at least one embodiment, the client 104 may include at least a portion of the functionality of the thresholding module 128. In some embodiments, a portion of the functionality of the aggregation module 126 may be implemented on the client 104. For example, the functionality of the aggregation module 126 that collects event data such as bandwidth results, stream starts and stops, buffer alerts, rebuffers, stream switches, geolocation information, etc. rate may be implemented on the client 104 to enable a client side aggregation of data to be forwarded to implement dynamic bandwidth thresholds. FIG. 2 shows an illustrative architecture 200 of computing environment 100 in which one or more embodiments of client side stream switching and host side dynamic control of bandwidth thresholds may be implemented. In the architecture 200, a host 102 may be in communication with a plurality of clients 104 via a network 106. In the illustrated embodiment, the host 102 may transmit streaming media to the clients 104 for playback based on regional designations. As illustrated, the host 102 is equipped with one or more processors 114 and memory 112 to store data and applications such as modules 202 to process data. The modules 202 may include one or more modules, such as aggregation module 126, and may store data in a variety of formats, such as in a table format in the tables database 130.

In addition, the host 102 may include a bandwidth module 204 that monitors connection bandwidth to create and/or update correlations 206. The bandwidth module 204 supplies a bandwidth value to the aggregation module 126, which aggregates the bandwidth value with bit rate values received from the clients 104. In turn, the aggregated data is used to create and/or update the correlations 206. Minimum bandwidth requirements for streaming media to achieve uninterrupted playback at a particular bit rate may differ based different ISPs in a city or area and these requirements may change dynamically over time. The bit rate/bandwidth relationship of the correlations 206 is thus created and/or updated based on data aggregated from multiple clients that are receiving streams of media so that a new client accessing the service at a later point in time may benefit from the experience of earlier clients according to shared criteria.

In certain implementations, the correlations 206 are maintained by the host 102 based on one or more criteria and can accommodate different criteria for different clients 104. The criteria may include geolocation information such as a region, city, zip code, IP address of the client, and/or ISP of the client 104. The criteria may also include auxiliary information, such as client operating system, processor model, processor configuration, memory type, and/or memory configuration, network medium (e.g., fiber, cable, DSL, wireless, etc.) across which a client connects to a network, time of day (e.g., when a client makes a request for, when the client receives the streaming media, when a bandwidth test is completed, etc.), and the like. Other criteria are possible. In at least one implementation, correlations 206 are reflected in bit rate/bandwidth tables correlated by region that are maintained in the tables database 130. In other implementations, meanwhile, correlations 206 are reflected in buffering tables that are correlated by processor model. These buffering tables are also maintained in the tables database 130 and may change the amount of content (e.g., video, audio, etc.) that is buffered before playback begins. Data may be aggregated by the aggregation module 126 for many types of criteria and auxiliary information. Initially, the correlations 206 reflected in the tables are built from the data aggregated by the module 126. In the illustrated example, the bit rate/bandwidth tables 208 are served to a plurality of clients 104 according to a determination that the basis of a particular correlation is most relevant to that client or group of the clients 104.

As illustrated, the correlations 206 for multiple regions are dynamic and may change over time as additional data is gathered by interactions between the host 102 and the clients 104. For example, a first table 208(1) for Region 1, Day 1 shows a set of bit rate/bandwidth correlations of 300/500, 600/1000, 900/1200, and 1500/1800. Similarly, a table 208(2) for Region 1, Day L (where L is a positive integer) contains another set of bit rate/bandwidth correlations of 300/600, 600/1200, 900/1800, and 1500/2000. Notice that the correlations 206 represented in the bit rate/bandwidth tables 208 for Region 1 show an increase in bandwidth requirement for uninterrupted or substantially uninterrupted delivery of the predetermined bit rates between Day 1 and Day L. In contrast, the correlations 206 represented in the bit rate/bandwidth tables 208 for Region N show a decrease in bandwidth requirement for uninterrupted or substantially uninterrupted delivery of the predetermined bit rates between Day 1 and Day L.

In the example above, Region 1 may represent a city served by an ISP employing traffic sharing techniques (e.g., throttling, bandwidth allocation reduction, etc.), whereas Region N may represent an area served by an ISP that has upgraded its delivery system, such as by expanding fiber-optic installation or other improvements in a broadband communication network 106. In each instance, a client 104 receiving media via the service at a later point in time, such as on Day L, may benefit from an update of the correlations 206. The correlations 206 may benefit the clients 104 even when it is the first time that a particular client is receiving streaming media. The use of regions is but one example of geolocation information and a combination of geolocation types may be included in the correlations 206. In other implementations, the correlations 206 could be based on auxiliary information (e.g. client operating system, client processor type, type of client memory, the configuration of the client memory, etc.). In those instances, the bit/rate bandwidth table served to various clients may be based on data correlated by the auxiliary information so that later clients 104 benefit from the updated correlations 206.

The host 102 serves updated correlations, such as via the bit rate/bandwidth tables 208, to one or more of clients 104. In at least one embodiment, updates may be performed periodically and served to clients by the host 102, thereby creating dynamically updated bandwidth thresholds that may account for various network and equipment changes affecting the clients 104. In at least one embodiment, in the absence of a change in one or more of the correlations 206 or when the change fails to meet a configurable threshold, the update may not be served or may be delayed until it meets the threshold.

As illustrated, the tables 208 from correlations 206 serve as input to rules (not shown) included in a rules database 210 being executed on the clients 104. Each client 104 runs rules from a rules database 210 particular to that client. Generally these rules are set by manufacturers or distributors of clients 104 and not by the host 102. However, in some instances the user 108 and/or the host 102, or an entity associated with the host 102 may be involved in setting the client rules. The rules enable the client 104 to receive and playback the streaming media. The rules may be static, but accept input such as the tables 208. Clients use thresholds to determine when to update bit rate, etc. Clients use the rules to perform this update. Host 102 may dynamically update the thresholds used by the clients based on correlations 206 which encapsulate data from similarly situated clients by serving appropriate tables 208 to the clients. In this manner, even though the rules on the clients may be static, dynamic bandwidth thresholds are enabled as a result of the correlations 206 being served periodically from the host 102 to the client 104.

Illustrative Operation

Figure 3:
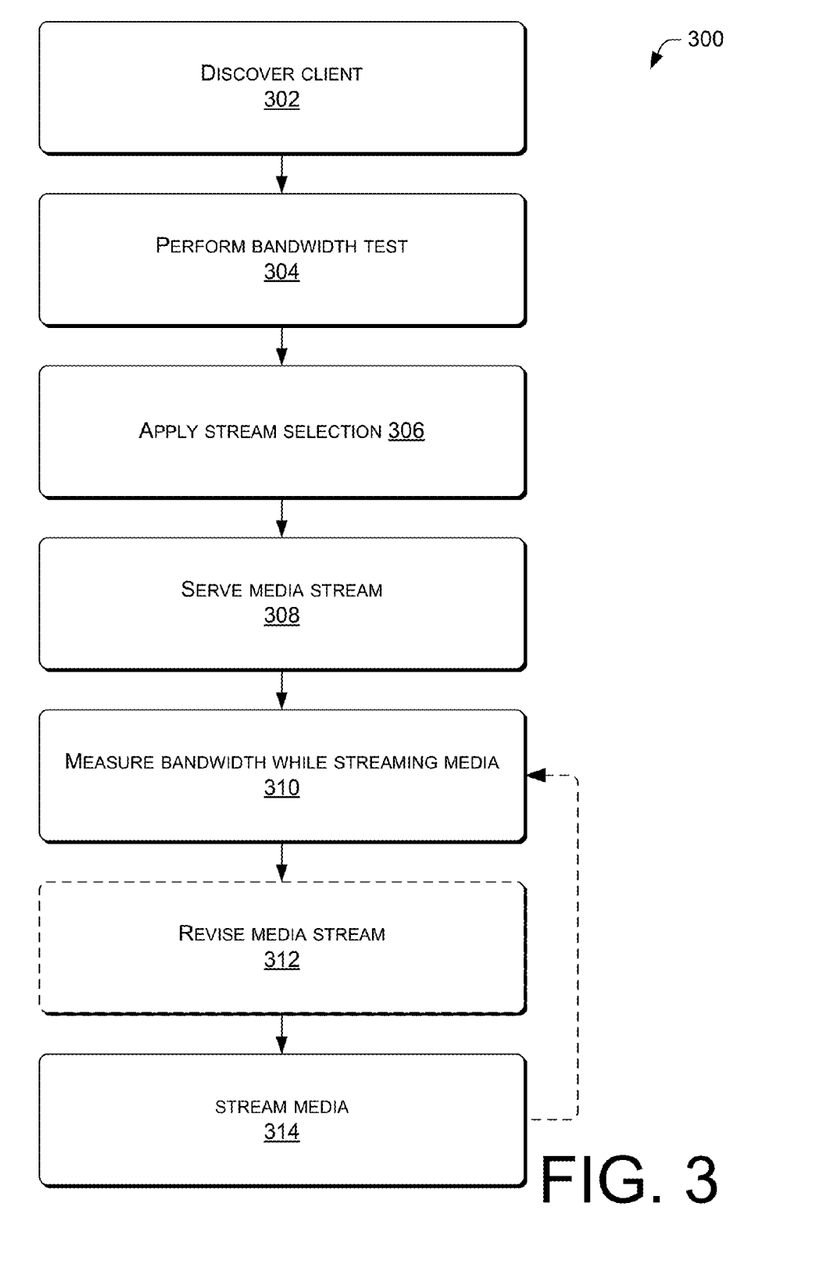
FIG. 3 is a flow diagram of an illustrative process in which one or more embodiments of dynamic bandwidth thresholds may be implemented.

FIG. 3 shows an illustrative process 300 of dynamically adjusting bandwidth thresholds when streaming media. The process 300 is illustrated as a collection of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the process 300 is described with reference to the environment 100 of FIG. 1 and/or the architecture 200 of FIG. 2. Other processes described throughout this disclosure, in addition to process 300, shall be interpreted accordingly.

At 302, the host 102 discovers the client 104 connected via the network 106. In some embodiments, a first connection rate is discovered between the host 102 and the client 104. For example, the streaming module 118 may provide streaming media encoded at different bit rates, such as 500 kbps, 1000 kbps, and 1500 kbps, although other bit rates may be used, including higher or lower bit rates. In some embodiments, the client 104 may establish a connection with the host 102 to enable receipt of the streaming media at a first bit rate.

At 304, a bandwidth test is performed on the connection between the host 102 and the client 104. The bandwidth test may be performed by the host, or by the client, or by a combination of the host and client. In some embodiments, the host 102 may determine the bandwidth of the connection through various techniques, such as by analyzing the network connection, using a previous bandwidth determination, or by other techniques. The host 102 may transmit streaming media to the client 104 at an original bit rate to fill an initial buffer, such as one of the buffers 136. For example, the host may send a short burst of streamed media to the client to test available bandwidth.

As previously described above, the host 102 may maintain multiple versions of the same media, encoded at different bit rates. The streaming module 118 may select the highest possible bit rate for streaming the media to the client 104 to provide the highest quality of playback while maintaining an uninterrupted or a substantially uninterrupted stream. In some embodiments, a first stream of media may include a relatively low bit rate value to ensure uninterrupted or substantially uninterrupted streaming of media. For example, if the host 102 has four versions of the media, the host may transmit the lowest or second to lowest bit rate stream of media to the client 104 during the operation 304. The client buffer may include a predetermined capacity based on time or data size for the first stream of media. In some embodiments, the initial buffer may include, of example, two to five seconds of the first stream of media while other amounts (durations) of streaming media may be stored in the initial buffer depending on the type of media (e.g., audio and/or video) and resolution of the media (e.g., low definition, high definition, etc).

In some embodiments, the host 102 may calculate the bandwidth of the network connection with the client 104 at 304 by measuring a time to fill a buffer. For example, the host 102 may determine how long the client 104 takes to fill the initial buffer having a known data size based on receipt of a message from the client 104 that indicates the initial buffer is full. The calculated bandwidth may be used to determine a recommended bit rate, which ultimately may be used to select a new bit rate that is appropriate given the current bandwidth constraints.

At 306, a media stream is selected from among the media streams encoded at different bit rates based on the bandwidth test at 304. For example, the stream selected may be determined as a function of the available bandwidth.

At 308, the streaming module 118 serves the selected media stream to the client 104 for playback.

At 310, at a predetermined amount of time after playback begins, the bandwidth on the connection between the host 102 and client 104 is measured by the bandwidth module 204 while the media is streaming. For example, at thirty-minutes or one hour after playback begins (or other possible intervals or randomly), the bandwidth module 204 may measure the bandwidth using one of the various techniques described at 304. Measuring the bandwidth while streaming media during playback may expose changes in bandwidth that may result from Internet Service Provider (ISP) traffic sharing (e.g., throttling, bandwidth allocation reduction, etc.) or other reasons. In some embodiments, the bandwidth is measured when a buffer on client 104 reaches a predetermined minimum watermark. Additionally, only selected bandwidth measurements may be retained. The retained measurements may be limited to those deemed important due to a playback event while other periodic measurements may be counted and discarded. Some examples of playback events that may be deemed important include the stream starting, the stream stopping (indicating playback failure, buffer overfill, or the buffer falling below a watermark), rebuffering, stream switching, etc.

The host 102 may also periodically calculate the bandwidth using a system bandwidth check in addition to or without measuring the buffer fill rate as discussed above. For example, the host 102 may transmit packets of data having known data sizes to the client 104. The client 104 may transmit return messages to the host 102 upon receipt of each of the packets of data, thus enabling the host to calculate the bandwidth of the network connection between the host and the client. Other techniques of calculating the bandwidth may be used by the host 102. The bandwidth calculation that is performed while streaming media may occur at a fixed interval, periodically, randomly, or after a predetermined event. For example, the bandwidth calculation may occur one or more times every second to continuously monitor the network bandwidth.

At 312, the host 102 may optionally revise the bit rate of the stream based on the ongoing periodic evaluation of the bandwidth at 310. The bit rate may be increased if the measured bandwidth supports an available higher bit rate stream of media. If a higher bit rate is feasible as determined at 310, the host 102 may determine a status of the buffer fill level. If the buffer includes a low fill level or a reducing fill level, the buffer may eventually run empty which may cause an undesirable interruption in the stream of media. If the buffer fill level is relatively low, the heuristics module 124 may preemptively decide to decrease the bit rate at 312.

In some embodiments, the buffer fill level may have a predetermined minimum threshold referred to as a lower watermark and/or a predetermined maximum threshold referred to as an upper watermark. The host 102, via the client 104, may monitor the buffer fill level and determine when the buffer fill level drops below the lower watermark or rises above the upper watermark. In some embodiments, the heuristics module 124 may perform a statistical analysis of the buffer's activity to determine if the buffer's fill level is likely to reach zero bytes or to become completely full. For example, the client may take periodic samples such as consecutive snapshots of the buffer's fill level after the buffer fill level drops below the upper watermark or rises above the lower watermark, which may be received by the host 102 for analysis. Continuous periodic samples that indicate a decline in the buffer fill level may initiate the host 102 to begin streaming a decreased bit rate stream to the client 104, while continuous periodic samples that indicate an increase in the buffer fill level may initiate the host 102 to begin streaming an increased bit rate stream to the client 104. However, if the statistical analysis determines the buffer fill level will not run empty or become completely full, the bit rate may remain unchanged and the process 300 may continue streaming at the current bit rate, such as at the operation 308.

At 314, the host 102 may stream media having a new bit rate to a client 104 for storage in one of the buffers 130 to fill an initial buffer the next time the same client 104 connects to the host 102 via the network 106. Additionally, the host 102 may stream media having the new bit rate to another client 104 that shares a correlation 206 with the first client 104 when the second client connects to the host 102 via the network 106. The new bit rate may be selected by the heuristics module 124 of FIG. 1 based on the bandwidth of the network connection between the host 102 and the client 104, among other possible factors. For example, the aggregation module 126 of host 102 may determine whether the bandwidth can support a higher bit rate or the bandwidth cannot support the current stream bit rate and the bit rate needs to be lowered based on aggregated data from multiple clients sharing the correlation 206. For example, the correlation 206 may be based geolocation information shared by the multiple clients 104.

In some embodiments, the heuristics module 124 may select the most appropriate available bit rate for the stream to provide uninterrupted or substantially uninterrupted streaming of media to the user 108 while maintaining the highest quality of media. For example, the host 102 may include a piece of media which is encoded in five different bit rates designated as A, B, C, D, and E where "A" is the lowest bit rate and "E" is the highest bit rate. The host 102 may initially serve the stream at the bit rate "C" at 308. The client 104 may monitor the fill level of a buffer. The buffer fill level dropping below the lower watermark or rising above the upper watermark may be reported to the host 102. The heuristics module 124 may determine that the bit rate should be adjusted to either bit rate "E" or bit rate "D" when the buffer fill level rises above the lower watermark, and the heuristics module 124 may determine that the bit rate should be adjusted to either bit rate "A" or bit rate "B" when the buffer fill level drops below the upper watermark based on the measured bandwidth at 310. In some embodiments, the heuristics module 124 may selectively determine an ideal bit rate which may be used to select a new bit rate. The process 300 may indefinitely continue to monitor the bandwidth and make adjustments to the bit rate at the operation 312.

Figure 4:
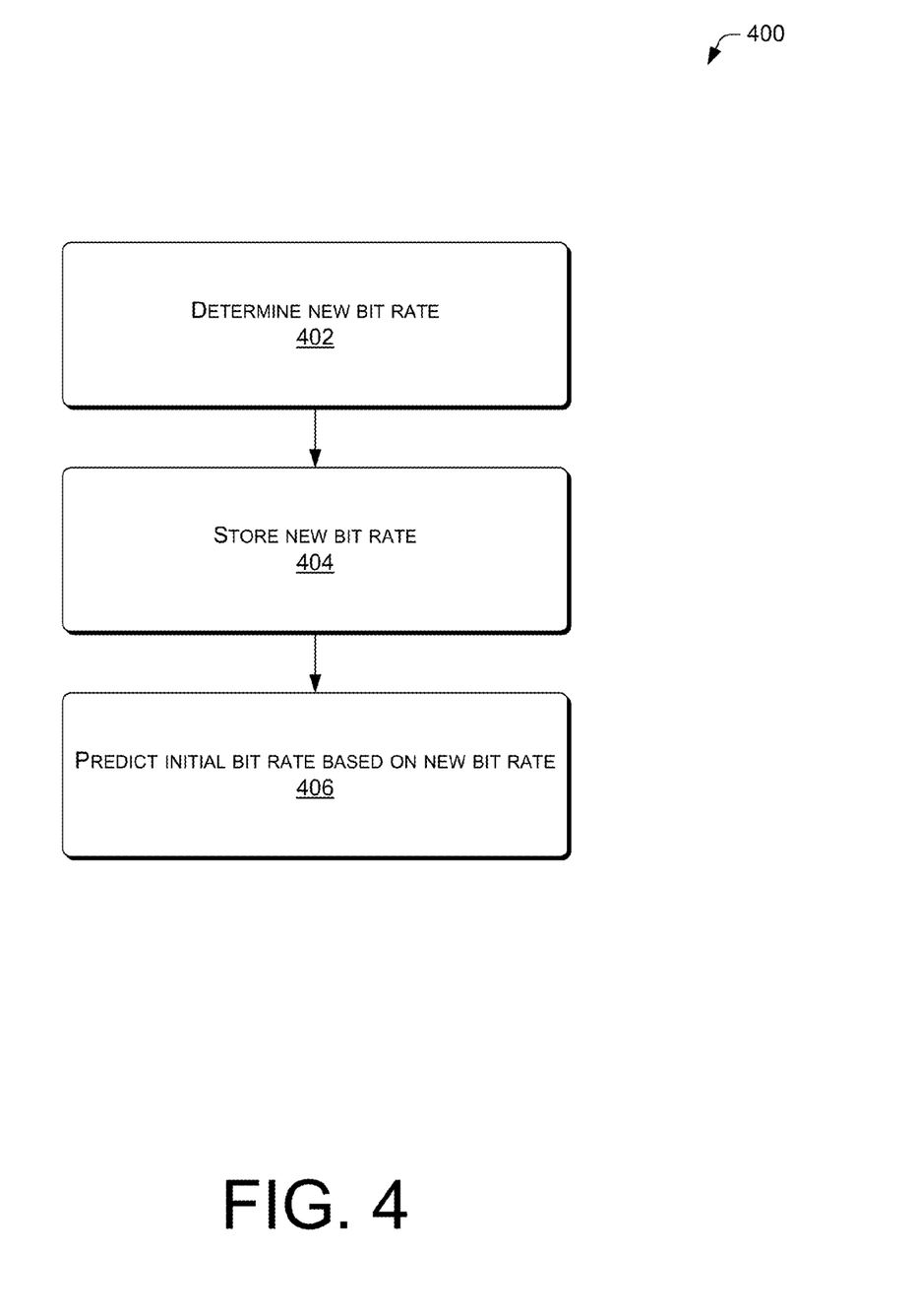
FIG. 4 is a flow diagram of an illustrative process of media stream revision in which dynamic bandwidth thresholds may be implemented.

FIG. 4 is a flow diagram of an illustrative process 400 of transitioning from a first stream at a first bit rate to a second stream at a second bit rate. The order in which operations of the process 400 are described is not intended to be construed as a limitation, and any number of the described blocks can be combined in any order and/or in parallel to implement the process. For discussion purposes, the process 400 is described with reference to the environment 100 of FIG. 1 and the architecture of FIG. 2. In some instances FIG. 4 may be considered a more detailed view of 312; however, process 400 may be performed independently from process 300.

At 402, the host 102 determines a new bit rate, such as the revised bit rate at 312 in accordance with changes in bandwidth that may result due to Internet Service Provider (ISP) traffic sharing (e.g., throttling, bandwidth allocation reduction, etc.) or for other reasons.

At 404, the new bit rate is stored for later use by the client or another similarly situated client. For example, the new bit rate may be stored in the correlations 206 in association with geolocation information of the client 104 to which the stream is being delivered.

At 406, from the stored bit rate, an initial bit rate for another client 104 may be predicted based on the new bit rate. In one or more embodiments, an initial bit rate for a client 104 may be predicted based on the new bit rate by matching the client 104 to one or more of the correlations 206, such as according to geolocation criteria, auxiliary criteria, or other client information. For example, an initial bit rate for the client 104 on a particular ISP in Seattle may be predicted based on the stored new bit rate for one or more other clients 104 on the same ISP in Seattle. In various embodiments the geolocation criteria may include client internet protocol (IP) addresses, the Internet Service Provider (ISP) serving the client, the city or geographical region in which the client is located, zip code, and the like. The auxiliary criteria, meanwhile, may include the client operating system, the client processor (e.g., the type of model), the type of client memory, the configuration of the client memory, network medium (e.g., fiber, cable, DSL, wireless, etc.) across which a client connects to a network, time of day (e.g., when a client makes a request for, when the client receives the streaming media, when a bandwidth test is completed, etc.), and the like.

Figure 5:
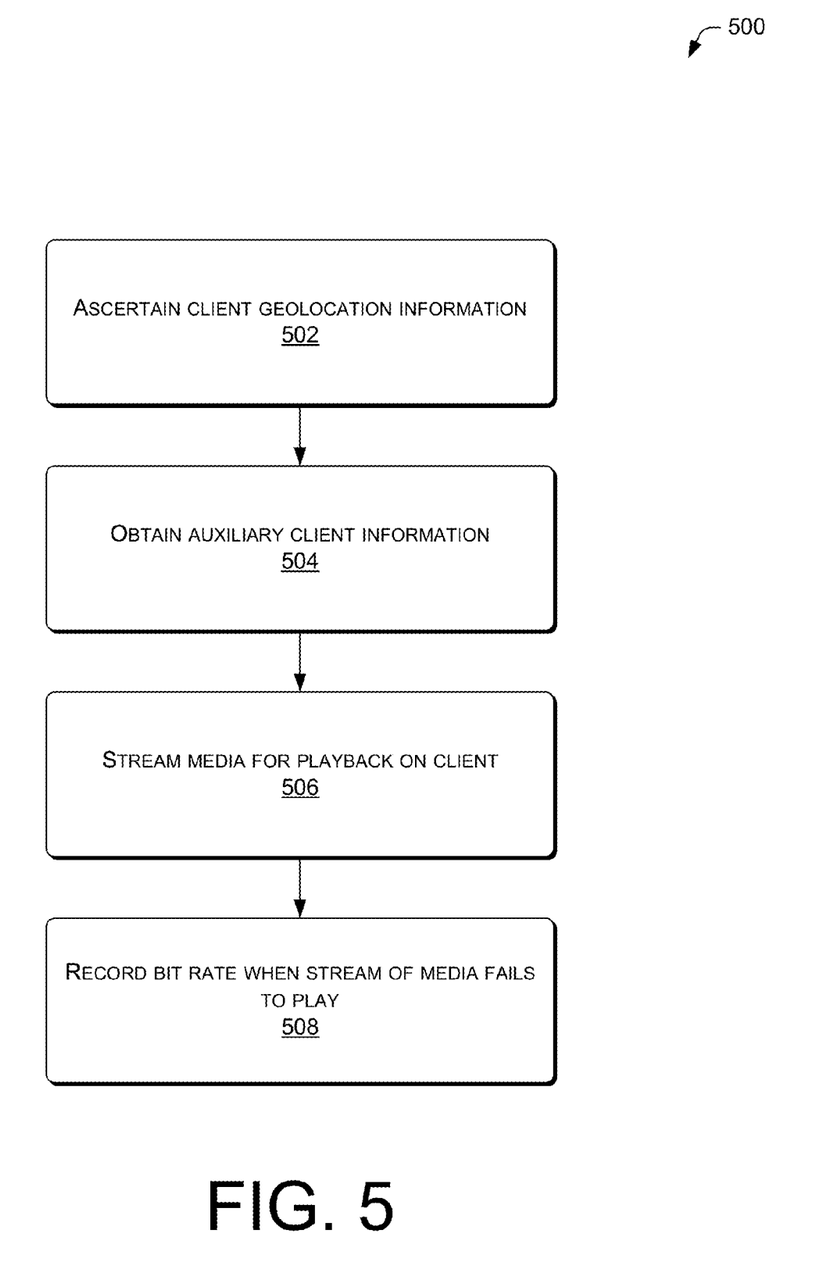
FIG. 5 is a flow diagram of an illustrative process of determining a new bit rate using an analysis of client information.

FIG. 5 is a flow diagram of an illustrative process 500 of determining an ideal bit rate for a client such as determining the new bit rate at 402. In some instances FIG. 5 may be considered a more detailed view of 402; however, process 500 may be performed independently from process 400. The order in which operations of the process 500 are described is not intended to be construed as a limitation, and any number of the described blocks can be combined in any order and/or in parallel to implement the process.

The host 102 may provide many different pieces of media from the media database 116 to the client 104 for output to the user 108. The process 500 may enable the host 102 to provide the highest bit rate of streaming media for the user 108 with previous streaming activity, typically during a continuous session of streaming different media content using an established network connection. The streaming media can be different content in different sessions such as previews of media content and the media content itself. As introduced in the discussion of FIG. 1, an individual piece of media may be an audio file such as an album, song, lecture, audio article or book. An individual piece of media may also be an audio/visual file such as a movie, a television program, or a live recording. Additionally, an individual piece of media may also be a preview of one of the other types of individual pieces of media.

At 502, the host 102 ascertains the client geolocation information. For instance, the host 102 may monitor the stream of media being delivered to the client 104. Alternately, a user 108 could provide the host 102 with all or part of the geolocation information for the client 104. For example, geolocation information may include client internet protocol (IP) addresses, identification of the Internet Service Provider (ISP), the city or geographical region in which the client is located, zip code, etc.

At 504, the host 102 may obtain auxiliary client information. Such auxiliary client information may be included in regular client communications, mined from client communications, and/or may be provided to the host 102 by the user 108 for the client 104. For example, auxiliary client information may include identification of the client operating system, identification of the client processor, for example by model, identification of the type of client memory, the configuration of the client memory, etc.

At 506, media is streamed for playback on the client device.

At 508, when the stream of media fails to play at the client 104, the bit rate is recorded. Thus, in at least one embodiment the bit rate when the buffer overfills and/or the buffer falling below a watermark due to bandwidth latency is recorded at 508. In various embodiments the process 500 is used to determine the new bit rate 402. For example, the bit rate recorded at 508, when the stream of media fails to play, may be one piece of data that is aggregated by aggregation module 126. Also, the new bit rate determined at 402 may be calculated as a function of the bit rate recorded at 508. When a new bit rate has been determined, the new bit rate may serve as a recommended bit rate for multiple clients sharing a correlation.

Figure 6:
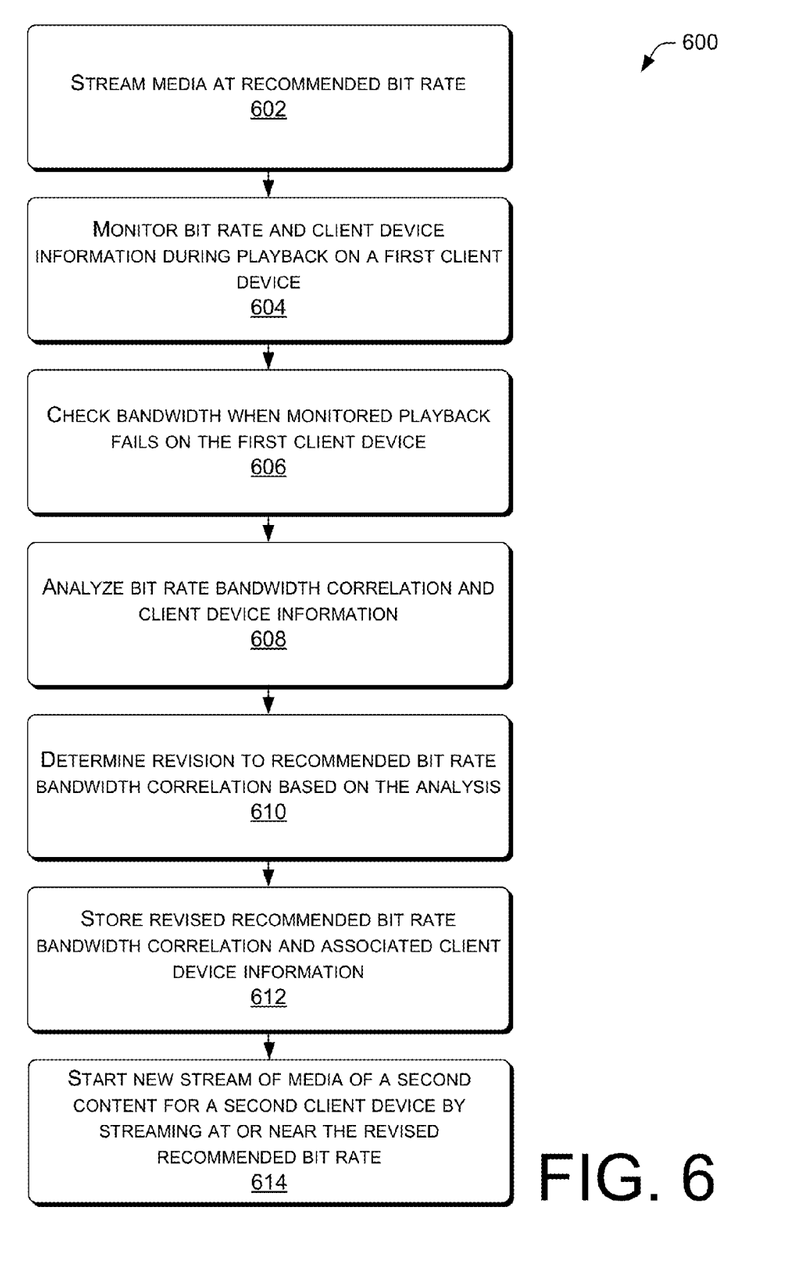
FIG. 6 is a flow diagram of an illustrative process implementing dynamic bandwidth thresholds.

FIG. 6 is a flow diagram of an illustrative process 600 of revising a recommended bit rate. In some instances, process 600 may begin responsive to the stream of media failing to play at 508. However, process 600 may be performed independently from process 500 and may begin periodically or upon the aggregation module 126 accumulating a predetermined number of bandwidth measurements and/or playback events. For example, process 600 may begin based on the bandwidth measured by bandwidth module 204 at 310. The order in which operations of the process 600 are described is not intended to be construed as a limitation, and any number of the described blocks can be combined in any order and/or in parallel to implement the process.

At 602, the host 102 may stream media at a recommended bit rate. For example, the recommended bit rate may be set as the predicted initial rate as discussed at 406 of the process 400.

At 604, the host 102 may monitor the bandwidth of the connection between the host and the client and client device information during play back on a first client device to detect changes in bandwidth that may be brought on due to Internet Service Provider (ISP) traffic sharing (e.g., throttling, bandwidth allocation reduction, etc.) or for other reasons. Client device information that is monitored may include geolocation information such as client internet protocol (IP) addresses, identification of the Internet Service Provider (ISP), the city or geographical region in which the client is located, zip code, etc. Client device information may also include auxiliary client information such as identification of the client operating system, identification of the client processor, for example by model, identification of the type of client memory, the configuration of the client memory, network medium (e.g., fiber, cable, DSL, wireless, etc.) across which a client connects to a network, time of day (e.g., when a client makes a request for, when the client receives the streaming media, when a bandwidth test is completed, etc.), and the like. The monitoring at 604 may be used to evaluate whether the current bit rate is suitable in the current conditions (e.g., available bandwidth, type of network connection, low power state, etc.). If the current bit rate is not suitable in the current conditions e.g., due to bandwidth latency, to minimize playback failure and rebuffering, the media stream may be revised as discussed above at 312.

At 606, when the first stream of media of the first content fails to play because of buffer underfill (underrun, exhaustion), or for other content delivery reasons, the bandwidth is checked and/or the bit rate is recorded. A stream of media may fail to play for a variety of reasons including loss of the connection between the host 102 and client 104 and other events causing the client reception of the stream to stop indicating playback failure, rebuffering, stream switching, etc. Thus, in at least one embodiment, the bit rate and bandwidth are recorded when the buffer empties and/or the buffer falls below a watermark at 606. The aggregation module 126 may aggregate the information recorded at 606 with other information as well as geolocation information and auxiliary information from multiple clients for analysis by the host 102.

At 608, the correlation 206 created and/or updated based on data aggregated from multiple clients according to shared criteria including existing bit rate/bandwidth thresholds and the client device information from among those monitored at 604 are analyzed. Based on the analysis, the heuristics module 124 and/or the aggregation module 126 set or update correspondences between available bandwidth and the bit rate for streaming media periodically according to correlations in the data. For example, the thresholding module 128 may perform a regular update of a threshold correspondence. The thresholding module 128 may also apply limits on the threshold updates. For example, the thresholding module 128 may limit the corresponding bandwidth to no more than twice the bit rate or a multiple of the bit rate. Other appropriate limits may be used.

At 610, a revision to the recommended bit rate/bandwidth correlation is determined based on the analysis at 608. For instance, revising the recommended bit rate/bandwidth correlation may cause another, later, client 104 connected to network 106 via the same ISP as a previous client 104 to receive a media stream requiring no or substantially no rebuffers during playback of the media stream.

At 612 the revised recommended bit rate/bandwidth thresholds and associated client device information are stored such as in a next iteration of correlations 206.

At 614 a new stream of media of a second content for a second client device at streamed at or near the revised recommended bit rate. In some embodiments the revised recommended bit rate is selected for the second client device based on matching one or more criteria from the client device information.

Figure 7:
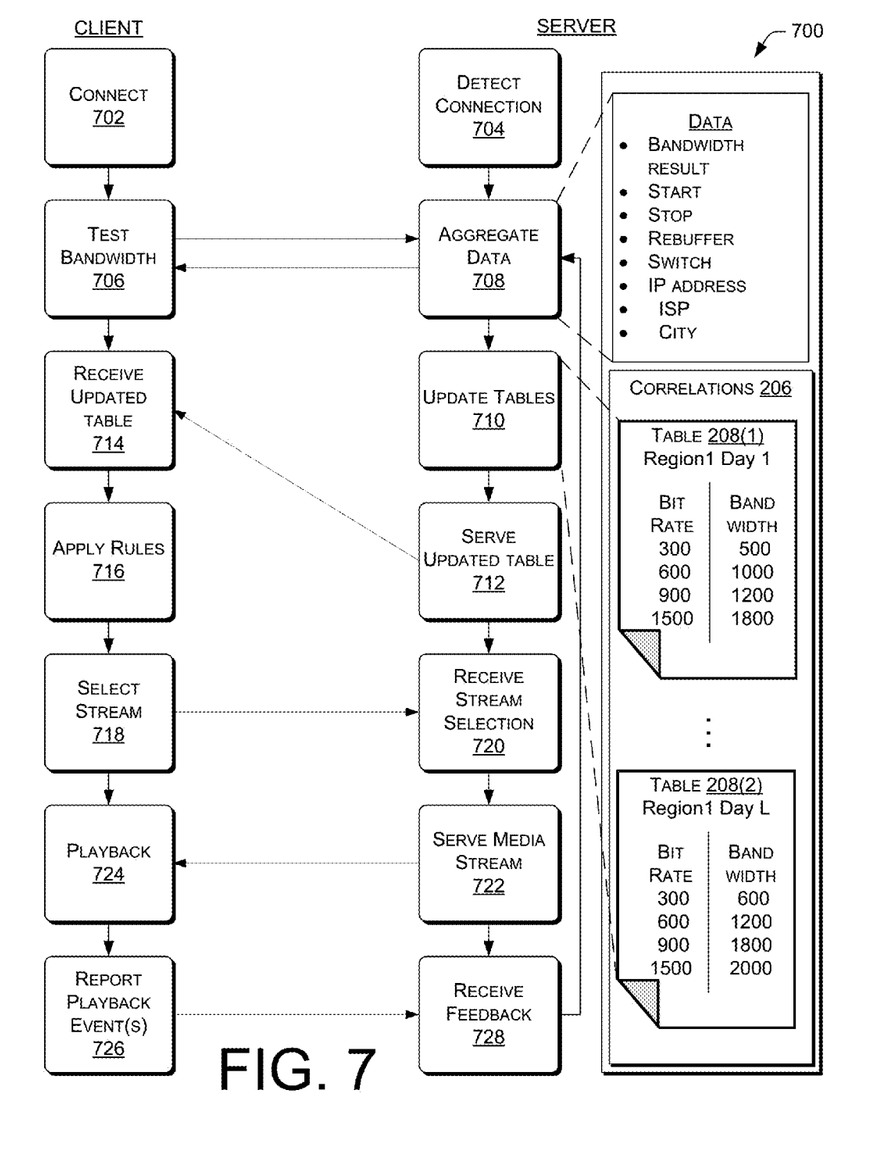
FIG. 7 is a flow diagram of an illustrative process in which one or more embodiments of dynamic bandwidth thresholds may be implemented for streaming media.

FIG. 7 is a flow diagram of an illustrative process 700 of implementing dynamic bandwidth thresholds for media streaming. The process 700 may begin at 702 by a client 104 connecting to a network 106 between the client 104 and a host 102. At 704, the host 102 discovers the client 104 connected via the network 106.

At 706, a bandwidth between the host and the client is tested. Although illustrated at the client in this instance, the bandwidth test may be performed by the host, or by the client, or by a combination of the host and client in accordance with the arrows illustrating transfer of information. In some embodiments, a first connection rate is discovered between the host 102 and the client 104. For example, the streaming module 118 may provide streaming media encoded at different bit rates, such as 500 kbps, 1000 kbps, and 1500 kbps, although other bit rates may be used including more or fewer bit rates. The host 102 may send a short burst of media to the client to test the available bandwidth. In some embodiments, the host 102 may determine the bandwidth of the connection, such as by analyzing the network connection, using a previous bandwidth determination, or by other techniques. The host 102 may transmit streaming media to the client 104 at an original bit rate to fill an initial buffer, such as one of the buffers 136.

As previously described above, the host 102 may maintain streams of media encoded at different bit rates for a single piece of content, such as a movie or a song. The streaming module 118 may select the highest possible bit rate of media for streaming to the client 104 to provide the highest quality of media while maintaining an uninterrupted or a substantially uninterrupted stream of media. In some embodiments, a first stream of media may include a relatively low bit rate value to ensure uninterrupted or substantially uninterrupted streaming of media. For example, if the host 102 has four encoded bit rate versions of the stream of media, the host may transmit the lowest or second to lowest bit rate stream of media to the client 104 during the operation 706. The initial buffer may include a predetermined capacity based on time or storage size for the first stream of media. In some embodiments, the initial buffer may include, for example, two to five seconds of the first stream of media while other amounts (durations) of streaming media may be stored in the initial buffer depending on the type of media (e.g., audio and/or video) and resolution of the media (e.g., low definition, high definition, etc).

At 708, the host 102 may aggregate data from the connections with one or more clients 104. In some embodiments, the host may calculate the bandwidth of the network connection with the client 104 as part of aggregating at 708. For example, the host 102 may determine how long the client 104 takes to fill the initial buffer having a known storage size. The calculated bandwidth may be used to determine a recommended bit rate that may be used to select a second bit rate, which will be discussed in greater detail below. Furthermore, the host 102 may aggregate a collection of client data including, but not limited to, bandwidth test results, stream starting, stream stopping, rebuffering, stream switching, client IP address, ISP, city, network medium (e.g., fiber, cable, DSL, wireless, etc.), time of day, and others.

At 710, the appropriate tables in correlations 206 are updated based on the aggregated data as discussed above. As illustrated, clients 104 may be associated by region, and thus a new table, such as for "Region 1," may be updated periodically, such as daily, or more or less often. Clients 104 may also or alternately be associated by other criteria or combinations of criteria such as by auxiliary information in combination with geolocation information. In such an example, tables in correlations 206 could be updated and served to clients connected via a particular ISP based on the operating system running on the client. Other combinations are envisioned.

At 712, the host 102 serves an updated table to the client 104 for receipt by the client at 714. Upon receipt of an updated table, the client 104 may start a process to apply the rules from the rules database 210 for determining which bit rate stream the client will select at 716. In several embodiments, the process of determining which bit rate stream to select may be triggered by receiving the updated table, may begin a regularly scheduled intervals, or a combination thereof. Thus, by dynamically altering the data served to the rules, the rules themselves may remain static while enabling dynamic bandwidth thresholds.

At 718, in accordance with the applied rules from the rules database 210, the client 104 selects a stream and transmits the request to host 102. At 720, the host 102 receives the stream selection request from client 104. At 722, the host 102 serves the selected one of the multiple media streams to client 104. In other implementations, all or part of rules 212 may be applied at the host 102. In those implementations, the operations 718 and 720 may be performed at least in part on the host 102 prior to serving the multimedia stream to the client at step 722.

At 724, the client 104 commences playback of the media stream. In at least one instance (not shown), during playback, the media stream is monitored by the host 102, as discussed above, to detect changes in bandwidth that may be brought on due to Internet Service Provider (ISP) traffic sharing (e.g., throttling, bandwidth allocation reduction, etc.) or for other reasons. At 726, during playback, client 104 may report one or more playback events to the host 102. In accordance with one or more embodiments, playback events may include the stream starting, the stream stopping (indicating playback failure, buffer underrun, or the buffer falling below a watermark), rebuffering, stream switching, etc.

At 728, the host 102 receives the playback event report as feedback. In several embodiments, the feedback received at 728 is incorporated in aggregating data at 708. In this way, the experience of receiving streaming media by earlier clients 104 is aggregated and heuristically applied to benefit clients connected to the host 102 later by revising the correlations 206 and updating the thresholds in the bit rate/bandwidth tables, so that based on the available bandwidth, there are no or substantially no occurrences of rebuffering for the clients connected later. This uninterrupted or substantially uninterrupted playback creates an improved viewing experience for the user 108.

Illustrative Host Architecture

Figure 8:
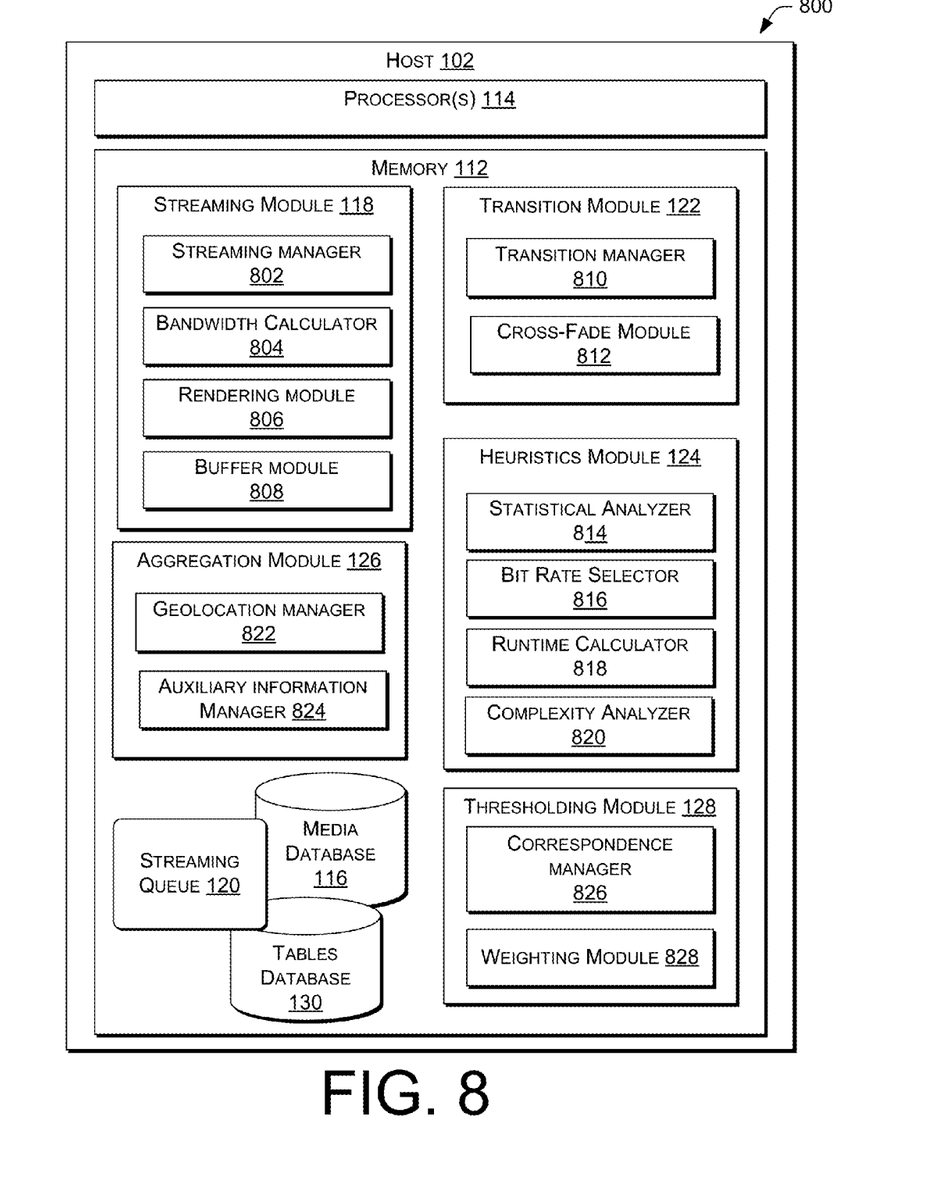
FIG. 8 shows a block diagram illustrating one or more embodiments of modules associated with the host server of FIG. 1.

FIG. 8 shows a block diagram of an architecture 800 illustrating one or more embodiments of modules associated with the host server 102 of FIG. 1. The architecture 800 includes one or more processors 114 and memory 112 containing instructions that are executable by the one or more processors 114.

The streaming module 118 may include a streaming manager 802, which provides streaming media at different bit rates that have been encoded and reside in the media database 116 and/or the streaming queue 120. Additionally, the streaming manager 802 may modify a media file, such as a lossy media file, before streaming the media, thus removing the need to maintain multiple files for each instance of media content.

A bandwidth calculator 804 may be used to calculate the bandwidth of the network connection between the host 102 and the client 104, such as described with regard to bandwidth module 204 and in the operations 304, 310, 506, 604, 606, and 706. A rendering module 806 may provide a visual or auditory output to the client 104 for playback by the presentation application 138. A buffer module 808 may monitor and/or analyze the buffer activity on the client, such as the buffers 136.

The transition module 122 may include a transition manager 810 to cause the host 102 to transition a continuous stream from a first stream of media to a second stream of media while maintaining an uninterrupted stream of media to the client 104 for playback to the user 108. The transition manager 810 may be configured to provide the highest bit rate to the user for the longest time possible without causing an interruption in the stream of media. A cross-fade module 812 may be used to gradually cross-fade audio and/or video, such as by dimming a first video renderer provided by the rendering module 806 while intensifying a second video renderer.

The heuristics module 124 may include a statistical analyzer 814. The statistical analyzer 814 may perform a statistical analysis of the buffer's activity to determine if the buffer's fill level is likely to reach zero bytes. For example, the statistical analyzer 814 may analyze periodic samples of the buffer's fill level after the buffer fill level drops below the watermark. A bit rate selector 816 may determine an ideal bit rate for streaming media based on a measured bandwidth of the network 106. The heuristics module 124 may dynamically control the selection of the bit rate of the media content to provide the highest bit rate stream of media to the user 108 based on the measured bandwidth, geolocation information, auxiliary client information, and history of Internet Service Provider (ISP) traffic sharing, e.g., throttling, bandwidth allocation reduction, among other factors, thus selecting an ideal bit rate rather than selecting an adjacent bit rate in every instance.

A runtime calculator 818 may calculate a runtime start at a future runtime for a second stream based on a time necessary to transition to the second stream including time to fill an initial buffer, thus enabling an uninterrupted transition to the second stream of media. A complexity analyzer 820 may create a stream complexity file based on a variable bit rate stream of media. In addition, the complexity module 820 may enable selecting an ideal bit rate or expanded buffer capacity to enable providing uninterrupted streaming media to the user 108 when the stream of media includes complex portions which may otherwise deplete the buffer.

The aggregation module 126 may include a geolocation manager 822. The geolocation manager 822 may manage client internet protocol (IP) addresses, identification of the Internet Service Provider (ISP), the city or geographical region in which the client is located, etc. In some embodiments, the geolocation manager 822 may modify geolocation information, such as that or a mobile device before the data is aggregated, thus obviating geographical inconsistencies that may become associated with the mobile device. The aggregation module 126 may also include an auxiliary information manager 824. The auxiliary information manager 824 may administer identification of the client operating system, identification of the client processor, for example by model, identification of the type of client memory, the configuration of the client memory, network medium (e.g., fiber, cable, DSL, wireless, etc.) across which a client connects to a network, time of day (e.g., when a client makes a request for, when the client receives the streaming media, when a bandwidth test is completed, etc.), and the like.

The thresholding module 128 may include a correspondence manager 826 to administer the information from one or both of the heuristics module 124 and the aggregation module 126 to set or update correspondences between available bandwidth and the bit rate for streaming media periodically. For example, the correspondence manager 826 may perform a weekly update of the threshold correspondence so that another, later, client 104 connected to network 106 via the same ISP as a previous client 104 may receive a media stream requiring no or substantially no rebuffers during playback of the media stream. The thresholding module 128 may also apply limits on the threshold updates. For example, correspondence manager 826 may limit the corresponding bandwidth to no more than twice the bit rate. A weighting module 828 may be used in the event that the thresholding module activates such a limit. The weighting module 828 may activate a weighting algorithm to revise the threshold correspondence, and/or may send a limit alert to one or more of the other modules on host 102.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, in at least one embodiment, process 300 as discussed regarding FIG. 3, is performed independently of processes 400, 500, 600, and 700, as discussed regarding FIGS. 4, 5, 6, and 7. However, in other embodiments, performance of one or more of the processes 300, 400, 500, 600, and 700 may be incorporated in, or performed in conjunction with each other. For example, process 500 may be performed in lieu of block 402 of FIG. 4.

What is claimed is:

1. A method of adjusting bandwidth thresholds for streaming media between a host and a client, comprising:
   serving, from the host to the client, a list of bandwidth thresholds and associated bit rate values to enable bit rate selection for streaming media between the host and the client, the list being associated with a geographic region, wherein the bandwidth thresholds in the list are determined based at least in part on data aggregated from multiple clients having a common internet protocol (IP) geolocation within the geographic region, wherein the list of bandwidth thresholds and associated bit rate values is updated based at least in part on the geographic region associated with the common IP geolocation;
   measuring a bandwidth between the host and the client while streaming media from the host to the client at one of the bit rate values;
   recording a bit rate for a first stream of media when the stream of media fails to play at the client due to bandwidth latency;
   ascertaining an IP geolocation of the client, the IP geolocation including at least one of an internet service provider (ISP) of the client or an IP address of the client, wherein the IP geolocation correlates to the geographic region of the list;
   determining an adjusted bit rate value for a second stream of media according to a function of the bandwidth between the host and the client and the IP geolocation of the client;
   storing, associated with the IP geolocation of the client, the adjusted bit rate value as one of the bit rate values; and
   sending the second stream of media to the client at an adjusted bit rate based at least on the IP geolocation of the client.

2. The method as recited in claim 1, wherein the ascertaining of the IP geolocation information of the client further comprises discovering at least one of:
   a city where the client is located; or
   a zip code where the client is located.

3. The method as recited in claim 1, further comprising:
   obtaining auxiliary information of the client, wherein the auxiliary information comprises at least one of a client operating system, a client processor model, a client memory type, a client memory configuration, or a time of day when the client makes a request for the stream of media; and
   sending the stream of media at the adjusted bit rate based at least on the auxiliary information of the client.

4. The method as recited in claim 1, further comprising:
   periodically analyzing the aggregated information of multiple clients, the aggregated information including at least one of the IP geolocation information of the multiple clients or auxiliary information of the multiple clients; and
   determining an ideal bit rate value from among the bit rate values to predict an initial bit rate of a subsequent stream of media based at least in part on the aggregated information.

5. The method as recited in claim 1, further comprising:
   aggregating the information collected from the multiple clients, the aggregated information including the IP geolocation information and bit rate information;
   serving an updated list of the plurality of bandwidth thresholds and the associated bit rate values for streaming media from the host to the client based at least on the aggregating; and
   sending the stream of media to one or more of the multiple clients at the adjusted bit rate based at least on the updated list.

6. The method as recited in claim 5, wherein the determining the adjusted bit rate value is based at least on the aggregating the IP geolocation information and the bit rate information of one or more of the multiple clients.

7. A method implemented by a host comprising:
   discovering a client connected to the host over a network connection;
   performing a bandwidth test on the network connection;
   determining a bit rate from a list of bandwidth thresholds and associated bit rate values to enable streaming media between the host and the client over the network connection based at least on the bandwidth test, the list being associated with a geographic region, wherein the bandwidth thresholds in the list are determined based at least in part on data aggregated from multiple clients having a common internet protocol (IP) geolocation within the geographic region, wherein the list of bandwidth thresholds and associated bit rate values is updated based at least in part on the geographic region associated with the common IP geolocation;
   serving a media stream from the host to the client at a first rate according to the bit rate determined from the list of bandwidth thresholds and associated bit rate values;
   measuring a bandwidth between the host and the client while streaming the media from the host to the client at the first rate; and revising the rate of the media stream to a second rate based at least on the bandwidth measured between the host and the client and an IP geolocation of the client in accordance with the list of bandwidth thresholds and associated bit rate values, the IP geolocation including at least one of an internet service provider (ISP) of the client or an IP address of the client, wherein the IP geolocation correlates to the geographic region of the list.

8. The method as recited in claim 7, further comprising receiving a selection of a bit rate of the media stream from the client.

9. The method as recited in claim 7, further comprising serving the media stream from the host to the client at the second rate.

10. The method as recited in claim 7, further comprising:
determining a new bit rate value based on at least one of a bit rate of the media stream or the bandwidth measured, the new bit rate being stored in a group of predetermined bit rate values; and
using the new bit rate to predict an initial bit rate of a subsequent stream of media content.

11. The method as recited in claim 7, wherein the measuring of the bandwidth between the host and the client is performed by the host.

12. The method as recited in claim 7, further comprising receiving a notification of a playback event from the client, the notification regarding at least one of the following playback events:
the media stream starting;
rebuffering, or
stream switching.

13. The method as recited in claim 7, wherein the measuring of the bandwidth between the host and the client is performed by the client, and further comprising receiving the measurement of the bandwidth from the client.

14. The method as recited in claim 13, further comprising receiving a client request for adjustment of the media stream, wherein the media stream served is based at least on the measurement of the bandwidth.

15. The method as recited in claim 13, wherein the host adjusts the media stream served based at least on the measurement of the bandwidth.

16. The method as recited in claim 13, wherein the host adjusts the media stream served based at least on a threshold associated with the measurement of the bandwidth.

17. The method as recited in claim 16, wherein:
the threshold associated with the measurement of the bandwidth is set by the host based at least on aggregated information; and
the threshold associated with the measurement of the bandwidth is sent from the host to the client.

18. The method as recited in claim 7, further comprising:
periodically analyzing the aggregated data of the multiple clients, the aggregated data including at least one of the IP geolocation information of the multiple clients or auxiliary information of the multiple clients; and
determining an ideal bit rate value from among the bit rate values to predict an initial bit rate of a subsequent stream of media based at least in part on the aggregated data.

19. A host system comprising:
one or more processors;
one or more computer readable media having computer-executable modules encoded thereon for programming the processor, the computer executable modules comprising:
an aggregating module to receive and aggregate information from one or more clients, the information including internet protocol (IP) geolocation information including at least one of an internet service provider (ISP) of the client or an IP address of the client;
a module to serve, to one of the one or more clients, a list of bandwidth thresholds and associated bit rate values to enable bit rate selection for streaming media between the host and the client, the list being associated with a geographic region, wherein the bandwidth thresholds and the associated bit rate values correlate to the IP geolocation information and are determined based at least in part on the geographic region associated with the one or more clients;
a thresholding module to update the list based at least in part on the information aggregated by the aggregating module and to send an updated threshold relationship to the one or more clients, the aggregated information correlating to the geographic region of the list; and
a presentation module to revise a rate of streaming media to the one or more clients according to the information received from the one or more clients and the updated list including the threshold relationship.

20. The host system as recited in claim 19, wherein the modules further comprise a heuristics module to periodically analyze the information aggregated by the aggregating module.

21. The host system as recited in claim 20, wherein the heuristics module determines a new bit rate by at least one of:
measuring a bandwidth of a network connection between the host and one or more clients,
ascertaining the internet protocol (IP) geolocation information of the one or more of the clients;
obtaining auxiliary information of the one or more of the clients; or
monitoring the bit rate for a stream of media when the stream of media fails to play at a client.

22. The host system as recited in claim 21, wherein the auxiliary information comprises at least one of a client operating system, a client processor model, a client memory type, a client memory configuration, or a time of day when the client makes a request for streaming media.

23. The host system as recited in claim 19, wherein the modules further comprise one or more of:
a streaming module to selectively serve streams of media at a plurality of bit rates and transmit at least one of the streams of media to the one or more clients;
a heuristics module to determine a new bit rate of a stream of media for the one or more clients and to determine when to initiate a transition to the new bit rate; and
a transition module to transition from an initial bit rate of the stream of media to the new bit rate.

24. The host system as recited in claim 19, wherein:
the information received by the aggregating module comprises an alert when a buffer at the one or more clients has a buffer fill value that drops below a watermark; and
the thresholding module updates the threshold relationship between the bandwidth and the bit rate for the streaming media based at least on the alert.

* * * * *